US008914605B2

(12) United States Patent
Grusy et al.

(10) Patent No.: US 8,914,605 B2
(45) Date of Patent: *Dec. 16, 2014

(54) METHODS AND SYSTEMS FOR FORMATTING STORAGE VOLUMES (71) Applicant: International Business Machines Corporation, Armonk, NY (US)

(72) Inventors: Ellen J. Grusy, Tucson, AZ (US); Brian D. Hatfield, Tucson, AZ (US); Kurt A. Lovrien, Tucson, AZ (US); Matthew Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/737,746

(22) Filed: Jan. 9, 2013

(65) Prior Publication Data

US 2013/0124813 A1 May 16, 2013

Related U.S. Application Data (63) Continuation of application No. 12/859,134, filed on Aug. 18, 2010, now Pat. No. 8,380,961.

(51) Int. Cl.
G06F 13/00 (2006.01)
G06F 13/28 (2006.01)
G06F 3/06 (2006.01)

(52) U.S. Cl.
CPC ............ G06F 3/0638 (2013.01); G06F 3/0605 (2013.01); G06F 3/0673 (2013.01)
USPC .................. 711/170; 711/E12.002; 707/822; 713/1

(58) Field of Classification Search
CPC .... G06F 3/0638; G06F 3/0605; G06F 3/0673
USPC ................ 711/170, E12.002; 707/822; 713/1
See application file for complete search history.

(56) References Cited

U.S. PATENT DOCUMENTS 6,237,079 B1 5/2001 Stoney
6,385,706 B1 5/2002 Ofek et al.
(Continued)

FOREIGN PATENT DOCUMENTS

WO 2008006674 A1 1/2008

OTHER PUBLICATIONS

"Check Point Copy for a Two Stage Store," www.ip.com, IP.com No. IPCOM000089366D, Mar. 4, 2005, 5 pages.

(Continued)

Primary Examiner — Edward Dudek, Jr.
(74) Attorney, Agent, or Firm — Griffiths & Seaton PLLC (57) ABSTRACT Methods, systems, and computer storage mediums including a computer program product method for formatting storage volumes are provided. One method includes creating a storage volume including a global counter and partitioned into multiple storage segments including a segment counter and partitioned into multiple stripes, wherein the global counter and each segment counter match at an initial time. The method further includes releasing the storage segments prior to completely reformatting the storage volume and subsequently incrementing the global counter such that the global counter and each segment counter no longer match at a subsequent time. The method further includes enabling a user to write data to the storage segments prior to completely reformatting the storage volume in response to incrementing the global counter. One system includes a processor for performing the above method and one computer storage medium includes a computer program product configured to perform the above method.

20 Claims, 3 Drawing Sheets

(56) References Cited

U.S. PATENT DOCUMENTS

| | | |
|---|---|---|
| 6,697,846 B1 | 2/2004 | Soltis |
| 6,718,436 B2 | 4/2004 | Kim et al. |
| 6,816,945 B2 | 11/2004 | Harris et al. |
| 7,107,385 B2 | 9/2006 | Rajan et al. |
| 7,130,960 B1 | 10/2006 | Kano |
| 7,562,203 B2 | 7/2009 | Scott et al. |
| 7,650,341 B1 | 1/2010 | Oratovsky et al. |
| 7,669,022 B2 | 2/2010 | Maruyama et al. |
| 7,685,396 B2 | 3/2010 | Sze et al. |
| 7,698,501 B1 | 4/2010 | Corbett et al. |
| 7,702,870 B2 | 4/2010 | English et al. |
| 7,725,651 B2 | 5/2010 | Saito |
| 8,380,961 B2 * | 2/2013 | Grusy et al. ............ 711/170 |
| 2006/0106891 A1 | 5/2006 | Mahar et al. |
| 2007/0043917 A1 * | 2/2007 | Matsui et al. ............ 711/156 |
| 2007/0233992 A1 | 10/2007 | Sato |
| 2007/0266037 A1 | 11/2007 | Terry et al. |
| 2008/0320061 A1 | 12/2008 | Aszmann et al. |
| 2009/0144496 A1 | 6/2009 | Kawaguchi |
| 2009/0182959 A1 | 7/2009 | Rao |
| 2009/0240880 A1 | 9/2009 | Kawaguchi |
| 2009/0271412 A1 | 10/2009 | Lacapra et al. |
| 2009/0271418 A1 | 10/2009 | Vaghani et al. |
| 2010/0042802 A1 | 2/2010 | Helman et al. |
| 2010/0077173 A1 | 3/2010 | Rao et al. |
| 2010/0082774 A1 | 4/2010 | Pitts |

OTHER PUBLICATIONS

Greenan et al.; "Reliability Mechanisms for File Systems Using Non-Volatile Memory as a Metadata Store"; ACM Digital Library; pp. 178-188; Oct. 2006.

Caudill et al.; "Tuning File System Block Addressing for Perforamnce"; ACM Digital Library' pp. 7-20; Mar. 2006.

U.S. Appl. No. 12/695,033, entitled "Extent Allocation in Thinly Provisioned Storage Environment," filed Jan. 27, 2010, 27 pages.

U.S. Appl. No. 12/859,137, entitled "Methods and Systems for Releasing and Re-Allocating Storage Segments in a Storage Volume," filed Aug. 18, 2010.

* cited by examiner

METHODS AND SYSTEMS FOR FORMATTING STORAGE VOLUMES

REFERENCE TO RELATED APPLICATIONS

This Application is a Continuation of U.S. patent application Ser. No. 12/859,134, now U.S. Pat. No. 8,380,961, filed on Aug. 18, 2010, the contents of which are incorporated herein by reference.

FIELD OF THE INVENTION

The present invention relates in general computing storage systems, and particularly to, methods and systems for formatting storage volumes in a storage system.

DESCRIPTION OF THE RELATED ART

After memory space in computing systems is allocated for use, the memory space needs to be formatted (or initialized) prior to storing data in the memory space. In addition, when the memory space is released from storing certain data, the memory space needs to be re-formatted (or re-initialized) prior to becoming available for storing subsequent data. Initialization of the memory space upon allocation and/or release may result in the storage space becoming temporarily unavailable for use or reuse for the period of time needed to complete the formatting process, which period of temporary unavailability is undesirable.

SUMMARY OF THE INVENTION

Various embodiments provide methods for formatting storage volumes. One method comprises creating a storage volume comprising a global counter and partitioned into a plurality of storage segments. In this embodiment, each storage segment comprises a respective segment counter and is partitioned into a plurality of stripes and the global counter and each respective segment counter match at an initial time, which may be an actual initial time or a constructive initial time. The method further comprises releasing, at a first time, the plurality of storage segments prior to completely reformatting the storage volume and incrementing the global counter in response to releasing the plurality of storage segments such that the global counter and each respective segment counter no longer match at the first time. Furthermore, the method comprises enabling a user to write data to the plurality of storage segments prior to completely reformatting the storage volume in response to incrementing the global counter.

Also provided are systems for formatting storage volumes. One system comprises a storage volume comprising a global counter and partitioned into a plurality of storage segments, a memory coupled to the storage volume, and a processor coupled to the storage volume and the memory. In this embodiment, each storage segment comprises a respective segment counter and is partitioned into a plurality of stripes and wherein the global counter and each respective segment counter match at an initial time, which may be an actual initial time or a constructive initial time. Furthermore, the processor configured to release, at a first time, the plurality of storage segments prior to completely reformatting the storage volume, increment the global counter in response to releasing the plurality of storage segments such that the global counter and each respective segment counter no longer match at the first time, and enable a user to write data to the plurality of storage segments prior to completely reformatting the storage volume in response to incrementing the global counter.

Various embodiments further provide physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product method for formatting storage volumes. One computer storage medium comprises computer program code for creating a storage volume comprising a global counter and partitioned into a plurality of storage segments. In this embodiment, each storage segment comprises a respective segment counter and is partitioned into a plurality of stripes and the global counter and each respective segment counter match at an initial time, which may be an actual initial time or a constructive initial time. The method further comprises computer program code for releasing, at a first time, the plurality of storage segments prior to completely reformatting the storage volume and computer program code for incrementing the global counter in response to releasing the plurality of storage segments such that the global counter and each respective segment counter no longer match at the first time. Furthermore, the computer storage medium comprises computer program code for enabling a user to write data to the plurality of storage segments prior to completely reformatting the storage volume in response to incrementing the global counter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The various embodiments discussed below provide systems and methods for formatting storage volumes. Also provided are computer storage mediums comprising a computer program product storing the method for formatting the storage volumes.

Figure 1:
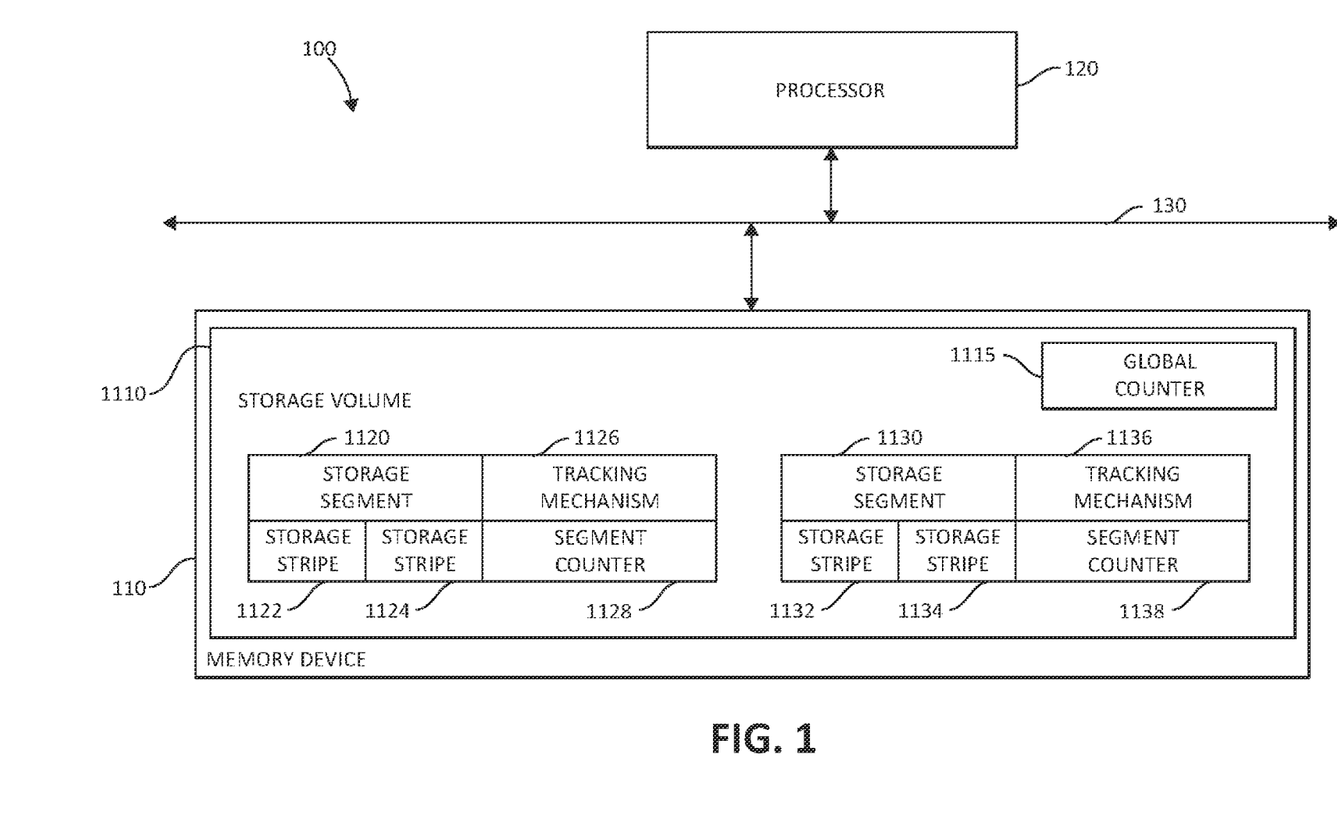
FIG. 1 is a block diagram of one embodiment of a system for formatting storage volumes.

Turning now to the figures, FIG. 1 is a block diagram of one embodiment of a system 100 for formatting storage volumes. At least in the illustrated embodiment, system 100 comprises a memory device 110 coupled to a processor 120 via a bus 130 (e.g., a wired and/or wireless bus).

Memory device 110 is divided into one or more storage volumes 1110 each comprising a global counter 1115 stored in volume metadata for each particular storage volume. Global counter 1115 is configured to be incremented when storage volume 1110, in its entirety, is released for use to one or more requesting entities (e.g., one or more customers, users, computing systems, computing devices, etc., each of which are not shown) in communication with system 100 and/or processor 120. That is, global counter 1115 is incremented when all of the storage segments (discussed below) in storage volume 1110 are released for use. Each storage volume 1110 is divided into a plurality of storage segments 1120 and 1130.

Storage segment 1120 is divided into a plurality of storage stripes 1122, 1124 and comprises a tracking mechanism 1126 (e.g., metadata, a bitmap, and the like tracking mechanisms) for tracking the formatting of each of storage stripes 1122 and 1124. Storage segment 1120 further comprises a segment counter 1128 stored in segment metadata for indicating when the metadata in storage segment 1120 needs to be re-initialized to indicate that storage stripes 1122 and 1124 need to be formatted.

Storage segment 1130 is divided into a plurality of storage stripes 1132, 1134 and comprises a tracking mechanism 1136 (e.g., metadata, a bitmap, and the like tracking mechanisms) for tracking the formatting of each of storage stripes 1132 and 1134. Storage segment 1130 further comprises a segment counter 1138 stored in segment metadata for indicating when the metadata in storage segment 1130 needs to be re-initialized to indicate that storage stripes 1132 and 1134 need to be formatted.

Segment counter 1128 is configured to be incremented to match global counter 1115 after the segment metadata in storage segment 1120 has been re-initialized to indicate that all of the storage stripes (e.g., storage stripes 1122 and 1124) in storage segment 1120 need to be formatted. Likewise, segment counter 1138 is configured to be incremented to match global counter 1115 after the segment metadata in storage segment 1130 has been re-initialized to indicate that all of the storage stripes (e.g., storage stripes 1132 and 1134) in storage segment 1130 need to be formatted.

Processor 120 is configured to release storage volume 1110 for use by one or more requesting entities prior storage volume 1110 being entirely (or fully) formatted. To accomplish this, in one embodiment, processor 120 is configured to create storage volume 1110 and divide storage volume into a plurality of storage segments (e.g., storage segment 1120, storage segment 1130, etc.) including the various structures described respectively above.

In one embodiment, processor 120 is configured to increment global counter 1115 and segment counters 1128, 1138 in a manner that global counter 1115 and segment counters 1128, 1138 all match when storage volume 1110 and storage segments 1120, 1130 are created (e.g., at an actual initial time or at a constructive initial time since each segment counter may be incremented to match global counter 1115 at a different time). Processor 120 is configured to subsequently release storage volume 1110 (i.e., all of the storage segments (e.g., storage segments 1120, 1130) in storage volume 1110) to one or more requesting entities and increment global counter 1115 in response to the release of storage volume 1110 to the one or more requesting entities and then harden storage volume 1110.

Processor 120 is further configured to receive requests (or commands) from the one or more entities to write (or destage) data to storage segment 1120. Processor 120 is configured to compare segment counter 1128 and global counter 1115 to determine if segment counter 1128 matches global counter 1115.

If segment counter 1128 and global counter 1115 do not match, processor 120 is configured to re-initialize the metadata in storage segment 1120 to indicate that all of the storage stripes (e.g., storage stripes 1122, 1124, etc.) in storage segment 1120 need to be formatted. Processor 120 is configured to then increment segment counter 1128 to match global counter 1115, which indicates that storage segment 1120 is in the process of being formatted or has already been formatted. Processor 120 is configured to then determine which of the storage stripes (e.g., storage stripes 1122, 1124, etc.) are going to be written to and formats the storage stripe(s) prior to writing the data to the storage stripe(s). Processor 120 is further configured to update tracking mechanism 1126 to indicate that the storage stripe(s) has/have been formatted.

In one embodiment, if segment counter 1128 and global counter 1115 match (i.e., storage segment 1120 is in the process of being formatted (e.g., by a background formatting thread) or has already been formatted (e.g., by the background formatting thread)), processor 120 is configured to determine, via tracking mechanism 1126, if the storage stripe(s) that is/are going to be written to has/have already been formatted. If a storage stripe has not been formatted, processor 120 is configured to format each storage stripe prior to writing the data to the storage stripe and then update tracking mechanism 1126 to indicate which storage stripe(s) has/have been formatted. If a storage stripe has already been formatted, processor 120 is configured to write the data to the storage stripe.

In another embodiment, storage segment 1120 may include an indicator that indicates that each storage stripe (e.g., storage stripes 1122, 1124, etc.) in storage segment 1120 has already been formatted. The indicator may be stored anywhere in storage segment 1120 (or storage volume 1110) including, but not limited to, tracking mechanism 1126, segment counter 1128, or a predetermined stripe. In this embodiment, processor 120 is configured to check the indicator if segment counter 1128 and global counter 1115 match. If the indicator indicates that each stripe has been formatted, processor 120 is configured to write the data to the storage stripe(s). If the indicator does not indicate that each stripe has been formatted, processor 120 is configured to determine, via tracking mechanism 1126, if the storage stripe(s) that is/are going to be written to has/have already been formatted. If a storage stripe has not been formatted, processor 120 is configured to format each storage stripe prior to writing the data to the storage stripe and then update tracking mechanism 1126 to indicate which storage stripe(s) has/have been formatted. If a storage stripe has already been formatted, processor 120 is configured to write the data to the storage stripe.

Processor 120 is further configured to receive requests (or commands) from the one or more entities to write (or destage) data to storage segment 1130. Processor 120 is configured to compare segment counter 1138 and global counter 1115 to determine if segment counter 1138 matches global counter 1115.

If segment counter 1138 and global counter 1115 do not match, processor 120 is configured to re-initialize the metadata in storage segment 1130 to indicate that all of the storage stripes (e.g., storage stripes 1132, 1134, etc.) in storage segment 1130 need to be formatted. Processor 120 is configured to then increment segment counter 1138 to match global counter 1115, which indicates that storage segment 1130 is in the process of being formatted or has already been formatted. Processor 120 is configured to then determine which of the storage stripes (e.g., storage stripes 1132, 1134, etc.) are going to be written to and formats the storage stripe(s) prior to writing the data to the storage stripe(s). Processor 120 is further configured to update tracking mechanism 1136 to indicate that the storage stripe(s) has/have been formatted.

In one embodiment, if segment counter 1138 and global counter 1115 match (i.e., storage segment 1130 is in the process of being formatted or has already been formatted), processor 120 is configured to determine, via tracking mechanism 1136, if the storage stripe(s) that is/are going to be written to has/have already been formatted. If a storage stripe has not been formatted, processor 120 is configured to format each storage stripe prior to writing the data to the storage stripe and then update tracking mechanism 1136 to indicate which storage stripe(s) has/have been formatted. If a storage stripe has already been formatted, processor 120 is configured to write the data to the storage stripe.

In another embodiment, storage segment 1130 may include an indicator that indicates that each storage stripe (e.g., storage stripes 1132, 1133, etc.) in storage segment 1130 has already been formatted. The indicator may be stored anywhere in storage segment 1130 (or storage volume 1110) including, but not limited to, tracking mechanism 1136, segment counter 1138, or a predetermined stripe. In this embodiment, processor 120 is configured to check the indicator if segment counter 1138 and global counter 1115 match. If the indicator indicates that each stripe has been formatted, processor 120 is configured to write the data to the storage stripe(s). If the indicator does not indicate that each stripe has been formatted, processor 120 is configured to determine, via tracking mechanism 1136, if the storage stripe(s) that is/are going to be written to has/have already been formatted. If a storage stripe has not been formatted, processor 120 is configured to format each storage stripe prior to writing the data to the storage stripe and then update tracking mechanism 1136 to indicate which storage stripe(s) has/have been formatted. If a storage stripe has already been formatted, processor 120 is configured to write the data to the storage stripe.

Processor 120 is configured to perform the operations discussed above for each storage segment in storage volume 1110. In this manner, storage volume 1110 is capable of being released to the requesting entities while storage volume 1110 is being formatted. In other words, storage volume 1110 is capable to being released for use during the formatting process and/or prior to being entirely or fully formatted. That is, as storage volume 1110 is being formatted, requests to write data to one or more particular storage segments triggers processor 120 to determine if the particular storage segment(s) has/have been formatted and format the storage segment(s) prior to writing the data to the storage segment(s) when the storage segment(s) have not already been formatted. In other words, processor 120 is configured to format each storage segment (e.g., storage segments 1120, 1130, etc.) and/or each storage stripe (e.g., storage stripes 1122, 1124, 1132, 1134, etc.) "on-the-fly" or on an ad hoc basis based on the formatting needs for each particular storage segment and/or storage stripe. As such, the requesting entity or entities are capable of writing data to and storing data in storage volume 1110 without having to wait for storage volume 1110 to be fully formatted, which saves time.

Figure 2:
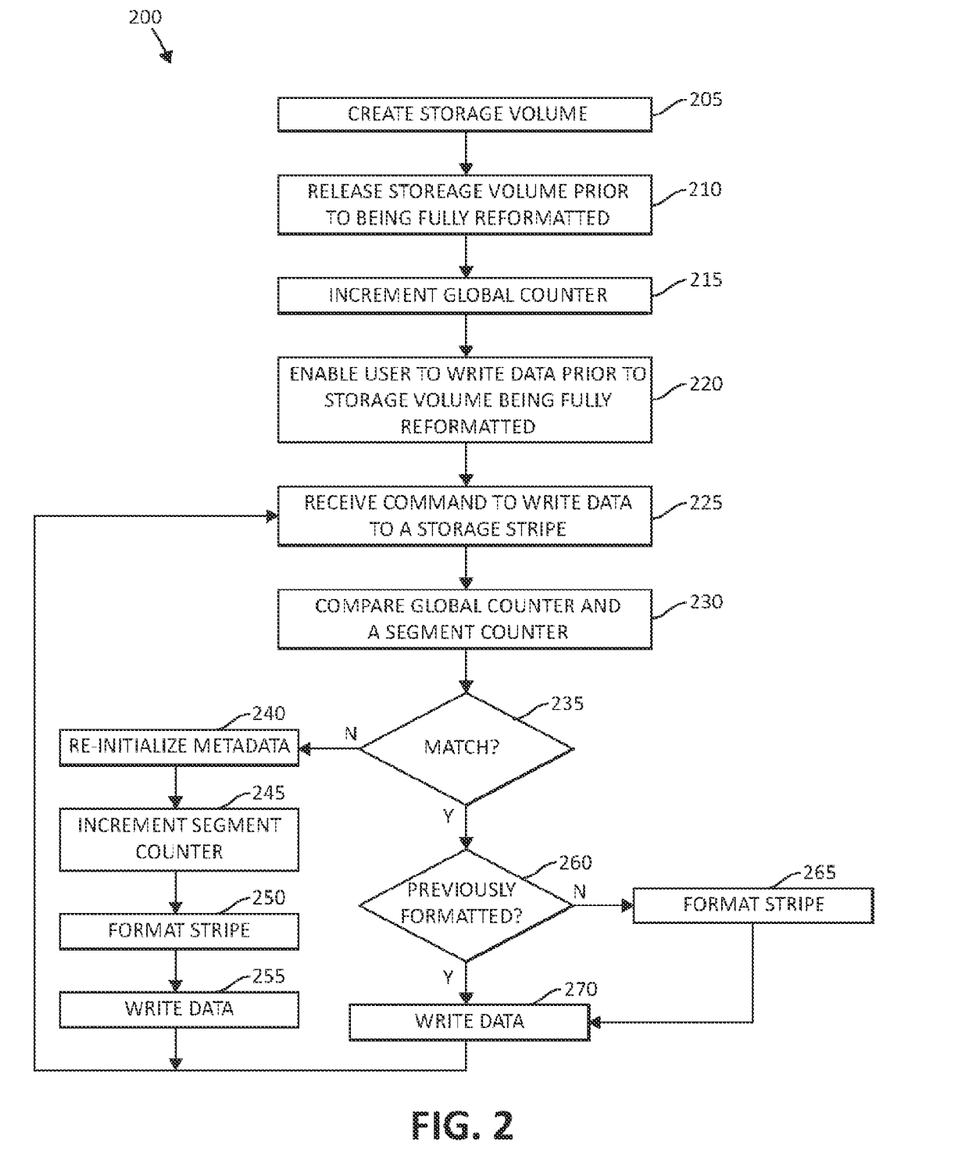
FIG. 2 is a flow diagram of one embodiment of a method for formatting storage volumes.

Turning now to FIG. 2, FIG. 2 is a flow diagram of one embodiment of a method 200 for formatting storage volumes. At least in the illustrated embodiment, method 200 begins by creating a storage volume (e.g., storage volume 1110) comprising a global counter (e.g., global counter 1115) and partitioned into a plurality of storage segments (e.g., storage segments 1120, 1130, etc.) (block 205). In one embodiment, each storage segment comprises a respective segment counter (e.g., segment counters 1128, 1138) and is partitioned into a plurality of storage stripes (e.g., storage stripes 1122, 1124, 1132, 1134, etc.) and the global counter and each respective segment counter are initialized match at an initial time.

The storage volume (i.e., all of the storage segments) is released at a time prior to completely reformatting the storage volume (block 210) and the global counter is incremented in response to releasing the plurality of storage segments such that the global counter and each respective segment counter no longer match after the storage segments are released (block 215). A user is then able to write data to the plurality of storage segments prior to completely reformatting the storage volume in response to incrementing the global counter (block 220).

In one embodiment, method 200 comprises receiving a command to write data to a stripe in a storage segment (block 225), comparing a segment counter associated with the storage segment and the global counter (block 230), and determining if the segment counter and the global counter match (block 235) when enabling the user to write data to the plurality of storage segments prior to completely reformatting the storage volume.

If the segment counter and the global counter do not match, metadata associated with the storage segment is re-initialized to indicate that each of the storage stripes in the storage segment require formatting (block 240) and the segment counter is incremented to match the global counter in response to re-initializing the metadata (block 245). The stripe is formatted after the metadata has been re-initialized (block 250) and the data is written to the stripe after the stripe is formatted (block 255), which is prior to completely reformatting the storage volume. Method 200 then returns to block 225.

If the segment counter and the global counter match (i.e., the storage segment is in the process of being formatted or has previously been formatted), method 200 comprises determining, via a tracking mechanism (e.g., tracking mechanism 1126 and tracking mechanism 1136), if the stripe has previously been formatted (block 260). If the stripe has not been previously formatted, the stripe is formatted (block 265) and the data is written to the stripe (block 270). If the stripe has been previously formatted, the data is written to the stripe (block 270). Method 200 then returns to block 225.

Figure 3:
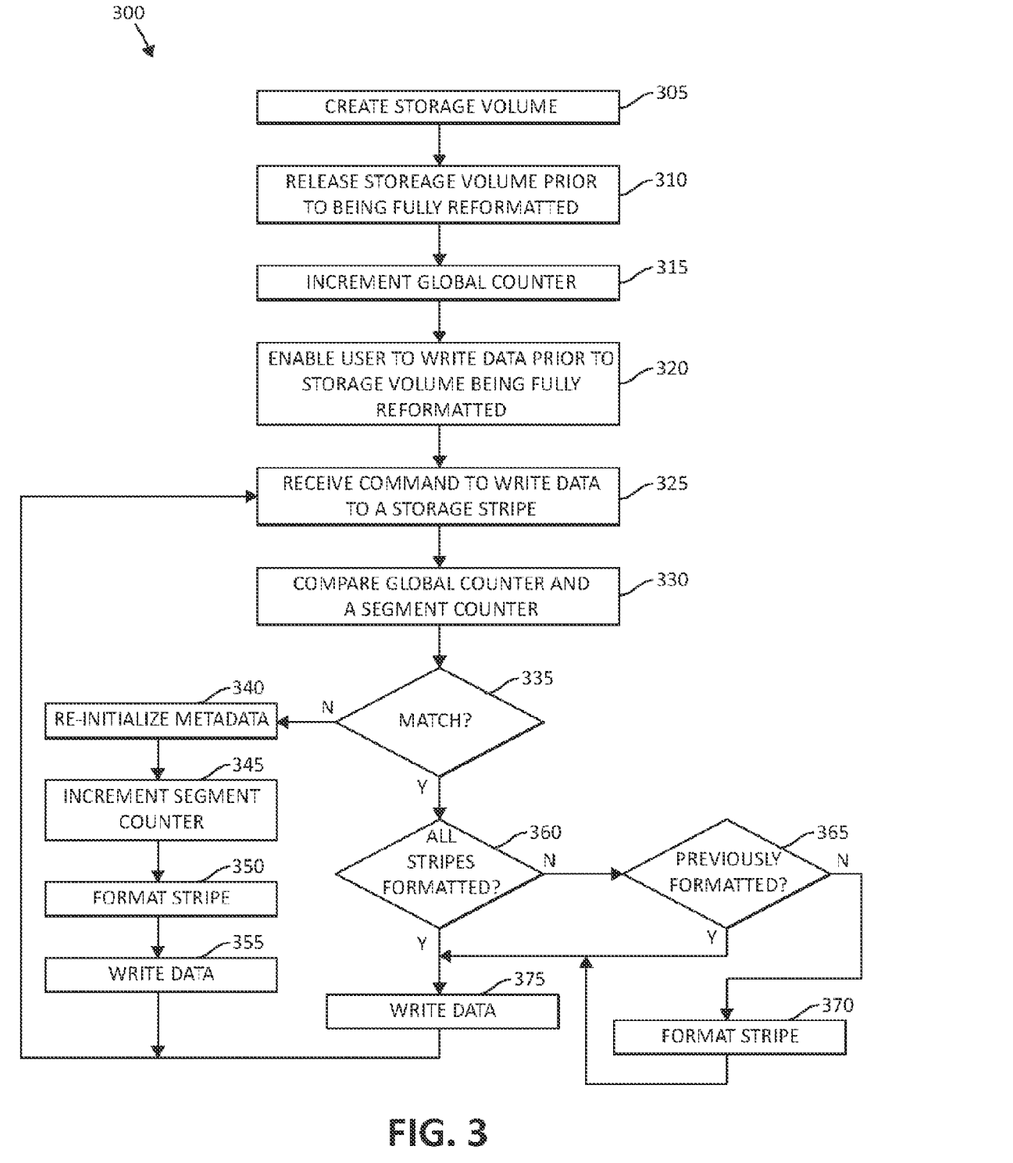
FIG. 3 is a flow diagram of another embodiment of a method for formatting storage volumes.

Turning now to FIG. 3, FIG. 3 is a flow diagram of one embodiment of a method 300 for formatting storage volumes. At least in the illustrated embodiment, method 300 begins by creating a storage volume (e.g., storage volume 1110) comprising a global counter (e.g., global counter 1115) and partitioned into a plurality of storage segments (e.g., storage segments 1120, 1130, etc.) (block 305). In one embodiment, each storage segment comprises a respective segment counter (e.g., segment counters 1128, 1138) and is partitioned into a plurality of storage stripes (e.g., storage stripes 1122, 1124, 1132, 1134, etc.) and the global counter and each respective segment counter are initialized match at an initial time.

The storage volume (i.e., all of the storage segments) is released at a time prior to completely reformatting the storage volume (block 310) and the global counter is incremented in response to releasing the plurality of storage segments such that the global counter and each respective segment counter no longer match after the storage segments are released (block 315). A user is then able to write data to the plurality of storage segments prior to completely reformatting the storage volume in response to incrementing the global counter (block 320).

In one embodiment, method 300 comprises receiving a command to write data to a stripe in a storage segment (block 325), comparing a segment counter associated with the storage segment and the global counter (block 330), and determining if the segment counter and the global counter match (block 335) when enabling the user to write data to the plurality of storage segments prior to completely reformatting the storage volume.

If the segment counter and the global counter do not match, metadata associated with the storage segment is re-initialized to indicate that each of the storage stripes in the storage segment require formatting (block 340) and the segment counter is incremented to match the global counter in response to re-initializing the metadata (block 345). The stripe is formatted after the metadata has been re-initialized (block 350) and the data is written to the stripe after the stripe is formatted (block 355), which is prior to completely reformatting the storage volume. Method 300 then returns to block 325.

If the segment counter and the global counter match, method 300 comprises determining if an indicator associated with the storage segment indicates that each stripe in the storage segment has been previously formatted (block 360). If the indicator indicates that each stripe in the storage segment has been previously formatted, the data is written to the stripe (block 375). If the indicator indicates that each stripe in the storage segment has not been previously formatted, method 300 comprises determining, via a tracking mechanism (e.g., tracking mechanism 1126 and tracking mechanism 1136), if the stripe has previously been formatted (block 365).

If the stripe has not been previously formatted, the stripe is formatted (block 370) and the data is written to the stripe (block 375). If the stripe has been previously formatted, the data is written to the stripe (block 375). Method 300 then returns to block 325.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for formatting storage volumes, comprising:
creating, in a memory device, a storage volume comprising a global counter and partitioned into a plurality of storage segments, wherein:
each storage segment comprises a respective segment counter and is partitioned into a plurality of stripes,
the global counter and each respective segment counter match at an initial time,
a match indicates that stripes in each respective segment do not require formatting, and
a mismatch indicates that the stripes in each respective segment require formatting;
releasing, from the memory device at a first time, the plurality of storage segments to one or more requesting entities prior to completely reformatting the storage volume;
incrementing the global counter in response to releasing the plurality of storage segments such that the global counter and each respective segment counter no longer match at the first time; and
writing data to the plurality of storage segments prior to completely reformatting the storage volume in response to incrementing the global counter.

2. The method of claim 1, wherein writing data to the plurality of storage segments in response to incrementing the global counter and prior to completely reformatting the storage volume comprises:
receiving a command to write first data to a first stripe in a first storage segment subsequent to the first time;
comparing a first segment counter associated with the first storage segment and the global counter;
determining if the first segment counter and the global counter match; and
re-initializing first metadata associated with the first storage segment to indicate that each of the plurality of stripes in the first storage segment require formatting if the first segment counter and the global counter do not match.

3. The method of claim 2, wherein writing data to the plurality of storage segments in response to incrementing the global counter and prior to completely reformatting the storage volume further comprises incrementing the first segment counter to match the global counter in response to re-initializing the first metadata.

4. The method of claim 3, wherein writing data to the plurality of storage segments in response to incrementing the global counter and prior to completely reformatting the storage volume further comprises:
formatting the first stripe after the first metadata has been re-initialized; and
writing the first data to the first stripe after the first stripe is formatted and prior to completely reformatting the storage volume.

5. The method of claim 4, wherein writing data to the plurality of storage segments in response to incrementing the global counter and prior to completely reformatting the storage volume comprises:
receiving a command to write second data to a second stripe in a second storage segment subsequent to the first time;
comparing a second segment counter associated with the second storage segment and the global counter;
determining that the second segment counter and the global counter do not match;
re-initializing second metadata associated with the second storage segment to indicate that each of the plurality of stripes in the second storage segment require formatting;
incrementing the second segment counter to match the global counter in response to re-initializing the second metadata;
formatting the second stripe; and
writing the second data to the second stripe after the second stripe is formatted and prior to completely reformatting the storage volume.

6. The method of claim 2, wherein writing data to the plurality of storage segments in response to incrementing the global counter and prior to completely reformatting the storage volume comprises:
determining, via a tracking mechanism associated with the first storage segment, if the first stripe has previously been formatted if the first segment counter and the global counter match;
writing the first data to the first stripe if the first stripe has been previously formatted; and
formatting the first stripe and then writing the first data to the first stripe if the first stripe has not been previously formatted.

7. The method of claim 2, wherein writing data to the plurality of storage segments in response to incrementing the global counter and prior to completely reformatting the storage volume comprises:
determining if an indicator associated with the first storage segment indicates that each stripe in the first storage segment has been previously formatted if the first segment counter and the global counter match;
writing the first data to the first stripe if the indicator indicates that each stripe in the first storage segment has been previously formatted;
determining, via a tracking mechanism associated with the first storage segment, if the first stripe has previously been formatted if the indicator indicates that each stripe in the first storage segment has not been previously formatted;
writing the first data to the first stripe if the first stripe has been previously formatted; and
formatting the first stripe and then writing the first data to the first stripe if the first stripe has not been previously formatted.

8. A system for formatting storage volumes, comprising:
a memory device comprising a storage volume, the storage volume comprising a global counter and partitioned into a plurality of storage segments, wherein:
each storage segment comprises a respective segment counter and is partitioned into a plurality of stripes,
the global counter and each respective segment counter match at an initial time, a match indicates that stripes in each respective segment do not require formatting, and a mismatch indicates that the stripes in each respective segment require formatting; and a processor coupled to the memory device, the processor programmed for:

releasing, from the memory device at a first time, the plurality of storage segments to one or more requesting entities prior to completely reformatting the storage volume, incrementing the global counter in response to releasing the plurality of storage segments such that the global counter and each respective segment counter no longer match at the first time, and writing data to the plurality of storage segments prior to completely reformatting the storage volume in response to incrementing the global counter.

9. The system of claim 8, wherein, when writing data to the plurality of storage segments in response to incrementing the global counter and prior to completely reformatting the storage volume, the processor is programmed for:

receiving a command to write first data to a first stripe in a first storage segment subsequent to the first time;

comparing a first segment counter associated with the first storage segment and the global counter;

determining if the first segment counter and the global counter match; and re-initializing first metadata associated with the first storage segment to indicate that each of the plurality of stripes in the first storage segment require formatting if the first segment counter and the global counter do not match.

10. The system of claim 9, wherein, when writing data to the plurality of storage segments in response to incrementing the global counter and prior to completely reformatting the storage volume, the processor is further programmed for incrementing the first segment counter to match the global counter in response to re-initializing the first metadata.

11. The system of claim 10, wherein, when writing data to the plurality of storage segments in response to incrementing the global counter and prior to completely reformatting the storage volume, the processor is further programmed for:

formatting the first stripe after the first metadata has been re-initialized; and writing the first data to the first stripe after the first stripe is formatted and prior to completely re-formatting the storage volume.

12. The system of claim 11, wherein, when enabling the user to write data to the plurality of storage segments in response to incrementing the global counter and prior to completely reformatting the storage volume, the processor is further programmed for:

receiving a command to write second data to a second stripe in a second storage segment subsequent to the first time;

comparing a second segment counter associated with the second storage segment and the global counter;

determining that the second segment counter and the global counter do not match;

re-initializing second metadata associated with the second storage segment to indicate that each of the plurality of stripes in the second storage segment require initialization;

incrementing the second segment counter to match the global counter in response to re-initializing the second metadata;

initializing the second stripe; and writing the second data to the second stripe after the second stripe is initialized and prior to completely reformatting the storage volume.

13. The system of claim 9, wherein, when writing data to the plurality of storage segments in response to incrementing the global counter and prior to completely reformatting the storage volume, the processor is further programmed for:

determining, via a tracking mechanism associated with the first storage segment, if the first stripe has previously been formatted if the first segment counter and the global counter match;

writing the first data to the first stripe if the first stripe has been previously formatted; and formatting the first stripe and then writing the first data to the first stripe if the first stripe has not been previously formatted.

14. The system of claim 9, wherein, when writing data to the plurality of storage segments in response to incrementing the global counter and prior to completely reformatting the storage volume, the processor is further programmed for:

determining if an indicator associated with the first storage segment indicates that each stripe in the first storage segment has been previously formatted if the first segment counter and the global counter match;

writing the first data to the first stripe if the indicator indicates that each stripe in the first storage segment has been previously formatted;

determining, via a tracking mechanism associated with the first storage segment, if the first stripe has previously been formatted if the indicator indicates that each stripe in the first storage segment has not been previously formatted;

writing the first data to the first stripe if the first stripe has been previously formatted; and formatting the first stripe and then writing the first data to the first stripe if the first stripe has not been previously formatted.

15. A non-transitory computer storage medium comprising a computer program product method for formatting storage volumes, the computer storage medium comprising:

computer program code for creating a storage volume comprising a global counter and partitioned into a plurality of storage segments, wherein:

each storage segment comprises a respective segment counter and is partitioned into a plurality of stripes, the global counter and each respective segment counter match at an initial time, a match indicates that stripes in each respective segment do not require formatting, and a mismatch indicates that the stripes in each respective segment require formatting;

computer program code for releasing, from a memory device at a first time, the plurality of storage segments to one or more requesting entities prior to completely reformatting the storage volume;

computer program code for incrementing the global counter in response to releasing the plurality of storage segments such that the global counter and each respective segment counter no longer match at the first time; and computer program code for writing data to the plurality of storage segments prior to completely reformatting the storage volume in response to incrementing the global counter.

16. The computer storage medium of claim 15, wherein the computer program code for writing data to the plurality of storage segments in response to incrementing the global counter and prior to completely reformatting the storage volume comprises:

computer program code for receiving a command to write first data to a first stripe in a first storage segment subsequent to the first time;

computer program code for comparing a first segment counter associated with the first storage segment and the global counter;

computer program code for determining if the first segment counter and the global counter match; and     computer program code for re-initializing first metadata associated with the first storage segment to indicate that each of the plurality of stripes in the first storage segment require formatting if the first segment counter and the global counter do not match.

17. The computer storage medium of claim 16, wherein the computer program code for writing data to the plurality of storage segments in response to incrementing the global counter and prior to completely reformatting the storage volume further comprises:

computer program code for incrementing the first segment counter to match the global counter in response to re-initializing the first metadata;

computer program code for formatting the first stripe after the first metadata has been re-initialized; and     computer program code for writing the first data to the first stripe after the first stripe is formatted and prior to completely reformatting the storage volume.

18. The computer storage medium of claim 17, wherein the computer program code for writing data to the plurality of storage segments in response to incrementing the global counter and prior to completely reformatting the storage volume further comprises:

computer program code for receiving a command to write second data to a second stripe in a second storage segment subsequent to the first time;

computer program code for comparing a second segment counter associated with the second storage segment and the global counter;

computer program code for determining that the second segment counter and the global counter do not match;

computer program code for re-initializing second metadata associated with the second storage segment to indicate that each of the plurality of stripes in the second storage segment require formatting;

computer program code for incrementing the second segment counter to match the global counter in response to re-initializing the second metadata;

computer program code for formatting the second stripe; and     computer program code for writing the second data to the second stripe after the second stripe is formatted and prior to completely reformatting the storage volume.

19. The computer storage medium of claim 16, wherein the computer program code for writing data to the plurality of storage segments in response to incrementing the global counter and prior to completely reformatting the storage volume further comprises:

computer program code for determining, via a tracking mechanism associated with the first storage segment, if the first stripe has previously been formatted if the first segment counter and the global counter match;

computer program code for writing the first data to the first stripe if the first stripe has been previously formatted; and     computer program code for formatting the first stripe and then writing the first data to the first stripe if the first stripe has not been previously formatted.

20. The computer storage medium of claim 16, wherein the computer program code for writing data to the plurality of storage segments in response to incrementing the global counter and prior to completely reformatting the storage volume further comprises:

computer program code for determining if an indicator associated with the first storage segment indicates that each stripe in the first storage segment has been previously formatted if the first segment counter and the global counter match;

computer program code for writing the first data to the first stripe if the indicator indicates that each stripe in the first storage segment has been previously formatted;

computer program code for determining, via a tracking mechanism associated with the first storage segment, if the first stripe has previously been formatted if the indicator indicates that every stripe in the first storage segment has not been previously formatted;

computer program code for writing the first data to the first stripe if the first stripe has been previously formatted; and     computer program code for formatting the first stripe and then writing the first data to the first stripe if the first stripe has not been previously formatted.

\* \* \* \* \*